UNITED STATES PATENT OFFICE 2,400,041

REACTION PRODUCTS OF TERTIARY ORGANIC HYDROPEROXIDES WITH FORMALDEHYDE

Frank H. Dickey, Oakland, Calif., assignor to Shell Development Company, San Francisco, Calif., a corporation of Delaware No Drawing. Application August 15, 1944, Serial No. 549,620

3 Claims. (Cl. 260—610)

This invention relates to a novel class of organic peroxides, and to a process for their manufacture. More particularly, the invention pertains to organic peroxides which may be formed by the reaction of formaldehyde with a tertiary organic hydroperoxide.

This application is a continuation-in-part of copending application Serial No. 515,813, filed December 27, 1943. The parent application describes and claims the reaction products formed by the interaction of any organic compound containing a carbonyl group with a tertiary organic hydroperoxide of the general formula

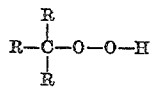

wherein each R represents a like or different organic, preferably saturated, aliphatic radical. In accordance with the teachings of the parent case, this interaction is effected in an acid medium, i. e. in the presence of an acid or acid-acting catalyst, and preferably at normal or subnormal temperatures, such as those of from about −10° C. to about 35° C. In the case of the interaction of an aldehyde with a tertiary organic hydroperoxide of the above formula, the addition product is a hydroxy peroxide. For instance, the addition of acetaldehyde to tertiary butyl hydroperoxide, when effected in the presence of an acid, e. g. hydrochloric acid, will result in the formation of alpha,alpha-dimethyl ethyl,alpha'-hydroxy ethyl peroxide having the general structural formula

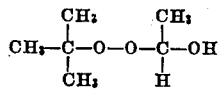

It has now been discovered that the reaction of formaldehyde with the mentioned tertiary organic hydroperoxides is unique, and that the addition product formed as a result of such interaction possesses certain properties and characteristics which are apparently not inherent in addition products formed as a result of the interaction of the tertiary organic hydroperoxides with other aldehydes, e. g. acetaldehyde, propionaldehyde, and their homologs and analogs. For instance, whereas the reaction between tertiary organic hydroperoxides and aldehydes above formaldehyde require the use of an acid or acid-acting catalyst, as this is described and claimed in the above application Serial No. 515,813, the addition of formaldehyde to said hydroperoxides occurs readily and effectively without the use of such catalysts. In fact, although acids may be used, it is preferable, particularly in the case where a tertiary alkyl hydroperoxide is reacted with formaldehyde to form the corresponding hydroxy methyl tertiary alkyl peroxide, to effect said reaction in the absence of any such catalyst, but in the presence of a solvent of the type described hereinbelow. Also, a reaction of a hydroxy methyl tertiary alkyl peroxide with a base causes the evolution of a gas containing hydrogen and methane. No such gas evolution apparently occurs when addition products of the mentioned hydroperoxides with aldehydes (other than formaldehyde) are subjected to the action of a base. The present invention therefore resides in the preparation of novel peroxides by reacting a tertiary organic hydroperoxide of the general formula

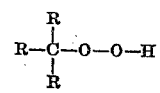

wherein each R represents a like or different organic radical which may or may not be further substituted with formaldehyde, this interaction being preferably effected at ordinary or subnormal temperatures and preferably in the absence of any dehydrating agent or catalyst, e. g. an acid or acid-acting material. This method of preparation results in the formation of the above-mentioned novel organic peroxides in which one of the oxygen atoms of the peroxy radical is directly attached to a carbon atom which in turn is directly linked to three other carbon atoms while the other oxygen atom of said peroxy radical is directly attached to a hydroxy methyl group. The invention also includes the process of preparing these novel peroxides.

Any hydroperoxide in which the organic radical is attached to the hydroperoxy radical via a tertiary carbon may be used as the reagent which is to be reacted with formaldehyde in the manufacture of the novel class of peroxides in accordance with the process of the present invention. A particularly suitable group of such hydroperoxides includes or comprises tertiary alkyl hydroperoxides. The following are illustrative examples of such tertiary alkyl hydroperoxides which may be used in the manufacture of the novel peroxides in accordance with the process of the present invention: tertiary butyl hydroperoxide, tertiary amyl hydroperoxide, and their homologs and analogs such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl pentane, and their homologs. Also, suitable substitution products such as the tertiary alkyl hydroperoxides in which a halogen atom or atoms are attached to one or more of the carbon atoms (other than the one carrying the hydroperoxyl radical) may be reacted with the organic compound containing a carbonyl group in accordance with the process of the present invention to produce the organic peroxides of the class defined herein. Such halo-substituted tertiary alkyl hydroperoxides may, for example, be obtained by the controlled oxidation with oxygen in the presence of hydrogen bromide of halogenated saturated aliphatic hydrocarbons of the type of 1-halo-2-methyl propane, 1-halo-2-ethyl propane, 1-halo-2-methyl butane, 1-halo-3-methyl butane, 2-halo-3-methyl butane, and the like. Still another group of hydroperoxides which may be thus employed in the process of the present invention includes compounds wherein one or more of the aliphatic radicals attached to the tertiary carbon atom (which is directly attached to the peroxy radical) are substituted by or contain attached thereto an aryl, alkaryl, aralkyl and/or alicyclic radical which may or may not be further substituted.

Although in some cases it may be proper or even advantageous to effect the reaction between the mentioned hydroperoxides and formaldehyde in the presence of catalysts such as acid or acid-acting catalysts it is generally preferable to operate in the absence of any such catalyst but in the presence of solvents or diluents which include the various ethers, water, etc. The reaction may be effected in the batch, intermittent or continuous manner. Although this reaction may be executed within a relatively wide temperature range, generally satisfactory yields of the novel peroxide compounds may be obtained by conducting the reaction in the liquid phase and at subnormal or normal temperatures, i. e. in the range of from about —10° C. to about 35° C. However, somewhat higher or lower temperatures may also be used, the optimum reaction temperature depending at least in part on the specific hydroperoxide employed. It was found that the reaction, particularly between tertiary butyl hydroperoxide and formaldehyde may be effectively realized by maintaining the reaction zone in a water bath, e. g. at a temperature of about 20° C. The reaction is usually elastic in the sense that any desired ratio of the peroxide and formaldehyde may be used and that various solvents or diluents may be employed if desired.

The novel class of compounds may be prepared according to the above process may be represented by the general formula

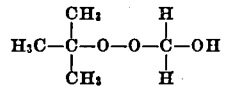

wherein R represents an organic grouping containing not less than four carbon atoms one of which is directly attached to the oxygen atom of the peroxy radical and to each of three other carbon atoms. In a preferred group of these novel compounds having the above general formula, the R represents a tertiary hydrocarbon radical. A particular subgroup of this group comprises the peroxides represented by the above formula in which R is a substituted or unsubstituted saturated alkyl radical which is directly attached to the peroxy oxygen atom by means of a tertiary carbon atom of aliphatic character, the following being illustrative examples of such radicals: tertiary butyl, tertiary amyl, tertiary hexyl, tertiary heptyl and their higher homologs and suitable substitution products, e. g. wherein a halogen atom or atoms are substituted for one or more of the hydrogen atoms of such radical. Specific examples of the above-defined subgroup of novel compounds are hydroxy methyl tertiary butyl peroxide and hydroxy methyl tertiary amyl peroxide.

The following examples are illustrative of the process of the present invention and describe a method of preparing the novel peroxidic compounds. It is to be understood, however, that there is no intention of limiting the invention to any specific details presented in these examples or to the specific peroxidic compounds produced thereby.

*Example I*

Approximately 110 cc. of an 80% aqueous solution of tertiary butyl hydroperoxide was added to about 400 cc. of ethyl ether and the cloudy solution thus formed was dried with sodium sulfate to form a substantially water-free clear solution. Formaldehyde which was generated by the thermal decomposition of 30 grams of tri-oxy methylene was then bubbled into the above solution. During the course of the run an increase in the temperature of the solution was noted. After the passage of all of the formaldehyde the ether solution of the product was distilled. A fraction boiling between about 48° C. and about 50° C. at 10 mm. of mercury was isolated and found to have a refractive index ($n$ 20/D) of 1.4128. This substance was found to be hydroxy methyl tertiary butyl peroxide having the general structural formula

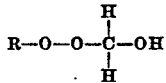

A determination of the molecular weight by active oxygen gave an equivalent weight of 120 as compared to the theoretical equivalent weight of 119.

*Example II*

30 grams of tri-oxy methylene was heated in a 250 cc. Claisen flask and the evolved formaldehyde was led into 500 cc. of an ethyl ether solution containing 83 grams of anhydrous tertiary butyl hydroperoxide. After the completion of this part of the run an additional 110 cc. of 77% tertiary butyl hydroperoxide was added to the ether solution and an additional 30 grams of tri-oxy methylene vaporized and the produced formaldehyde passed through said solution. The ether solution was then distilled off and the remaining material subjected to vacuum distillation to separate a fraction boiling between 48° C. and 52° C. at 10 mm. of mercury pressure. The fraction produced in a yield of 40.2% had a density ($d$ 20/4) of 0.96, a refractive index ($n$ 20/D) of 1.4128, and was found to be hydroxy methyl tertiary butyl peroxide of the above formula.

*Example III*

Equimolar amounts of commercial formalin and of tertiary butyl hydroperoxide were mixed and then subjected to vacuum distillation. A fraction boiling at about 50°-52° C. at 10 mm. of mercury pressure was recovered in a yield of about 65%, and was found to be hydroxy methyl tertiary butyl peroxide.

In accordance with the processes of the previous examples hydroxy methyl tertiary amyl peroxide is produced by the reaction of formaldehyde with tertiary amyl hydroperoxide.

The properties possessed by the novel peroxidic compounds adapt them admirably for use in various organic reactions as well as for other purposes. These compounds may be employed individually or in admixture with one another or with other substances as catalysts for various chemical reactions. For example, they may be used for the polymerization of polymerizable unsaturated compounds including both the conjugated and the non-conjugated unsaturated polymerizable compounds.

Although unsaturated organic compounds having a single polymerizable olefinic linkage, e. g. styrene, alpha-methyl styrene, many vinyl and allyl derivatives, and the nitriles and many esters of acrylic and alpha-substituted acrylic acids, all of which fall within the class of unconjugated unsaturated polymerizable organic compounds, may be effectively polymerized in the presence of the above defined class of novel catalysts to produce resins and resin-like substances, nevertheless of growing importance for resins is another group of unconjugated unsaturated compounds having two or more polymerizable non-conjugated double bonds between carbon atoms of aliphatic character. Examples of these are the unsaturated aliphatic polyesters of saturated polybasic acids, the unsaturated aliphatic polyethers of saturated polyhydric alcohols, and the unsaturated aliphatic esters of unsaturated aliphatic acids. Also included in this class are the polymerizable unsaturated compounds containing in the molecule one or more polymerizable organic radicals and one or more inorganic radicals or elements. Examples of such compounds are the vinyl, allyl and methallyl esters of phosphoric acid and of the ortho acids of silicon, boron, etc.

Another important group of compounds which may be polymerized by the novel peroxidic compounds of the present invention consists of polymerizable compounds having two or more and preferably two conjugated unsaturated carbon-to-carbon linkages. These compounds are substantially hydrocarbon in character, although they may contain substituents, such as halogen, nitro, sulfo, etc. By far the most important subgroup of such compounds comprises the hydrocarbons and substituted hydrocarbons having in the molecule two double bonds in conjugated relationship to one another, these double bonds being between carbon atoms of aliphatic character. Representative examples of such compounds are butadiene-1,3, 2-chlorbutadiene-1,3, isoprene, and the higher homologs thereof. In general, the polymerization of conjugated diene hydrocarbons and substituted hydrocarbons in accordance with the invention results in products which are synthetic elastomers in character and as a consequence belong to the general group of substances known as synthetic rubbers.

The invention in one of its phases is applicable to the polymerization of single compounds of the above-outlined groups and to the co-polymerization of two or more compounds; for instance in the production of compounds which are synthetic elastomers in character, one or more of the conjugated diene hydrocarbons may be polymerized in accordance with the process described herein and in the presence of the novel peroxide catalysts with one or more of the polymerizable unsaturated compounds of the type of styrene, acrylonitrile, isobutylene, vinyl chloride, methyl methacrylate, and the like. Synthetic resins usually require the addition of one or more plasticizers, stabilizers, lubricants, dyes, pigments, fillers, or other modifiers. Where these modifiers do not chemically react with or otherwise adversely affect the ingredients of the reaction mixture, they may be added to the monomer or other partially polymerized material during the polymerization reaction.

The novel peroxides of the present invention may be used as the polymerization catalysts either alone or in combination with one another or with other catalysts such as benzoyl peroxide, lauroyl peroxide, acetyl peroxide, benzoyl acetal peroxide, and hydrogen peroxide. Also, they may be employed in conjunction with activators, such as quinone, ferro-cyanides, and mercaptans, e. g. dodecyl mercaptan. The catalysts of the invention are ordinarily dissolved in the polymerizable compounds prior to polymerization. Amounts of catalyst as small as a fraction of a percent based on the weight of the monomer are catalytically effective. Larger percentages have correspondingly greater effect. Too much catalyst is generally to be avoided as likely to render the reaction violent or as adversely affecting the properties of the polymer, particularly as to molecular weight and the ramifications thereof. The amount of catalyst ordinarily varies from about 0.01% to about 5% or more by weight of the monomer.

The polymerization may be carried out in a continuous or discontinuous manner, under atmospheric, superatmospheric or reduced pressures. The polymerization will usually be energized by the application of heat, although both heat and light may be used, and in some cases light alone is sufficient. The invention may be applied to monomeric compounds in the massive state or to dispersions or solution of the monomer or monomers. Where the dispersion method is employed it is normally desirable to select a dispersing medium insoluble in the catalyst involved. In general, the temperatures customary for similar polymerization reactions under the influence of other catalysts, e. g. benzoyl peroxide, may be used. Depending upon the particular material and the conditions involved, temperatures of from about room temperature to about 200° C. may be used. This usually, although not necessarily, involves the use of superatmospheric pressures.

The term "polymerizable unconjugated unsaturated compounds" as used herein and in the appended claims refers to polymerizable unsaturated compounds which do not have in the molecule conjugated carbon-to-carbon unsaturated linkages between carbon atoms of aliphatic character.

I claim as my invention:

1. Hydroxymethyl tertiary butyl peroxide having the structural formula

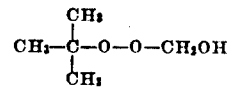

2. Hydroxymethyl tertiary amyl peroxide.
3. The compound of the formula

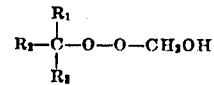

wherein $R_1$, $R_2$ and $R_3$ are alkyl radicals.

FRANK H. DICKEY.